United States Patent Office 3,687,809
Patented Aug. 29, 1972

3,687,809
PROCESS FOR PRODUCING L-LYSINE
FROM L-ASPARTIC ACID
Kiyoshi Nakayama, Sagamihara-shi, and Hiroshi Hagino, Hachioji-shi, Japan, assignors to Kyowa Hakko Kogyo Co., Ltd., Tokyo, Japan
No Drawing. Continuation of abandoned application Ser. No. 563,077, July 6, 1966. This application Aug. 6, 1968, Ser. No. 750,469
Claims priority, application Japan, July 7, 1965, 40/40,381
Int. Cl. C12d 13/06
U.S. Cl. 195—29                                4 Claims

ABSTRACT OF THE DISCLOSURE

A process for producing L-lysine by culturing a microorganism capable of producing L-lysine in an aqueous nutrient medium containing L-aspartic acid and at least a source of carbon and nitrogen under aerobic conditions.

CROSS-REFERENCE TO RELATED APPLICATION

This application is a continuation of copending applacation Ser. No. 563,077, filed on July 6, 1966 which application is now abandoned.

This invention relates to a process for producing L-lysine. More particularly, it relates to a process for the production of L-lysine by fermentation. Even more particularly, the invention relates to a process for the production of L-lysine from L-aspartic acid with microorganisms.

L-lysine, 2,6-diaminohexanoic acid, is an amino acid well known in the art. It has been used in the area of food enrichment, whereby the supplementation of wheat-based foods with lysine improves their protein quality and results in an improved growth and tissue synthesis. This compound has also been used medically as a nutrient. Thus, it would be most advantageous to have available a process for the production thereof which may be carried out economically on an industrial scale.

One of the objects of the present invention is to provide an improved process for the production of L-lysine which overcomes some of the disadvantages and deficiencies of the prior art methods.

Another object of the present invention is to provide a process for producing L-lysine by fermentation which may be carried out in an efficacious and simple manner.

A further object of the invention is to provide a process for producing L-lysine by fermentation which gives the product in high purity and good yield.

A still further object of the invention is to provide a process for producing L-lysine by fermentation which may be carried out advantageously on an industrial scale at low cost to give a high yield of product.

These and other objects and advantages of the present invention will become apparent to those skilled in the art from a consideration of the following specification and claims.

In accordance with the present invention, the present inventors have found the phenomenon that large quantities of L-lysine are produced by fermenting bacteria, actinomycetes or yeasts in a culture liquor which contains L-aspartic acid as the substrate. In fact, this process is most appropriate and advantageous for the production of L-lysine on a commercial scale.

Extensive examinations of various microorganisms indicate that the microorganisms capable of producing L-lysine by the fermentation of a culture liquor which contains L-aspartic acid as the substrate are widely distributed as to various strains of bacteria, actinomycetes and yeasts and that there is no direct relation between particular bacteria, actinomycetes and yeasts having these capabilities and their taxonomic properties. Thus, the process of the present invention is applicable to all strains which have the foregoing physiological characteristics. Therefore, for example, strains belonging to genera such as Arthrobacter, Corynebacterium, Brevibacterium, Bacillus, Pseudomonas, Cellulomonas, Streptomyces, Kloeckera, and the like are suitably employed in the present invention.

In the present invention, one of the main starting materials in the culture medium is L-aspartic acid, and culture media containing L-aspartic acid as well as essential nutrients for the growth of the particular microorganism utilized are employed. When the same culture media are employed, but in the absence of L-aspartic acid, the amount of L-lysine produced is negligibly small compared with media wherein L-aspartic acid has been added thereto.

Either a synthetic or a natural culture medium may be employed for the growth and fermentation of the microorganisms and, as noted above, as long as it contains the essential nutrients for the growth of the particular microorganism employed. Specifically, the culture medium should contain at least one nitrogen source, carbon source and inorganic salt as well as a small amount of any particular substance required for the nutrition of the particular microorganism employed in addition to L-aspartic acid.

The other details of culturing are conventional and well known to those skilled in the art. Thus, as a carbon source, there may be mentioned, by way of example, glucose, fructose, mannose, galactose, sucrose, maltose, lactose, raffinose, arabitol, mannitol, sorbitol, inositol, xylose, starch hydrolysate, waste molasses and the like. These substances may be used either singly or in mixtures of two or more. As a nitrogen source, various kinds of inorganic or organic salts or compounds such as ammonia, ammonium sulfate, ammonium chloride, ammonium nitrate, ammonium carbonate, ammonium acetate, etc., nitrates, urea, or natural compounds containing nitrogen, such as peptone, meat extract, yeast extract, cornsteep liquor, casein hydrolysate, fish meal and the like may be employed. These substances may also be used in admixture of two or more. Furthermore, essential nutrients for the growth of the microorganism employed include such substances as vitamins, for example, biotin, thiamine, cobalamin, etc. Inorganic salts which may be employed include potassium phosphate, magnesium sulfate, manganese sulfate, potassium chloride, ferrous sulfate, calcium carbonate, etc.

The L-aspartic acid may advantageously be added to the fermentation medium in the amount of from about 1% to 10% by weight.

The fermentation is carried out under aerobic conditions, such as aerobic shaking of the culture or with stirring of a submerged culture, at a temperature of from about 25° to 40° C. The pH is kept at about neutral at the beginning of culturing.

Two to seven days of culturing are appropriate for producing large quantities of L-lysine. It is preferred to keep the pH of the culture medium at about neutral during the fermentation.

The L-lysine produced is recovered by conventional ion exchange resin treatment including elution, concentration, precipitation, etc.

The following examples are given merely as illustrative of the present invention and are not to be considered as limiting. Unless otherwise indicated, the percentages set forth therein are by weight.

EXAMPLE 1

Various bacteria, actinomycetes and yeasts (shown in Table 1) are inoculated from an agar slant into large-sized test tubes each containing 10 ml. of the following culture medium:

| | Percent |
|---|---|
| L-aspartic acid (previously neutralized with ammonia) | 1 |
| Glucose | 1 |
| $K_2HPO_4$ | 0.05 |
| $MgSO_4 \cdot 7H_2O$ | 0.025 |
| $(NH_4)_2SO_4$ | 0.2 |
| Yeast extract | 0.3 |
| $CaCO_3$ | 0.3 |

The pH of the culture medium is adjusted to 7.0.

Culturing is then carried out with aerobic shaking of the culture at a temperature of 30° C. for four days. The amounts of L-lysine produced in the culture liquor are shown in Table 1. The L-lysine, as noted above, may be extracted from the various fermentation liquors by conventional ion exchange resin treatment.

TABLE 1

| Microorganisms employed: | Amount of L-lysine produced (mg./ml.) |
|---|---|
| Arthrobacter terregens KY 3158 | 0.3 |
| Arthrobacter flavescens KY 3154 | 0.3 |
| Brevibacterium imperiale KY 3456 | 0.3 |
| Corynebacterium pseudodiphtheritium KY 3541 | 0.3 |
| Bacillus cereus KY 3302 | 0.3 |
| Bacillus roseus KY 3354 | 0.3 |
| Arthrobacter ufleafaciens KY 3152 | 0.3 |
| Pseudomonas fluorescens KY 3954 | 1.0 |
| Brevibacterium helvolum KY 3467 ATCC 19390 | 2.1 |
| Brevibacterium linens KY 3469 ATCC 19391 | 2.1 |
| Cellulomonas cellasea KY 3491 | 2.1 |
| Streptomyces coelicolor | 0.3 |
| Streptomyces aureus K 13 | 0.3 |
| Streptomyces flavus 62 | 0.3 |
| Streptomyces 13 A | 3.0 |
| Kloeckera africana KY 5201 ATCC 16512 | 2.1 |

The invention being thus described, it will be obvious that the same may be varied in many ways. Such variations are not to be regarded as a departure from the spirit and scope of the invention and all such modifications as would be obvious to one skilled in the art are intended to be included herein.

What is claimed is:

1. In a fermentation process for the production of L-lysine by culturing a microorganism capable of producing L-lysine in an aqueous nutrient medium under aerobic conditions and accumulating said L-lysine in the resultant culture liquor, the improvement which comprises conducting the fermentation in the presence of from approximately 1 to 10% by weight of L-aspartic acid.

2. A process for producing L-lysine which comprises culturing a microorganism capable of producing L-lysine in an aqueous nutrient medium containing approximately 1 to 10% by weight of L-aspartic acid and at least a source of carbon and nitrogen under aerobic conditions, and recovering the L-lysine produced in the resultant culture liquor.

3. The process of claim 2, wherein said microorganism belongs to a genus selected from the group consisting of Arthrobacter, Brevibacterium, Corynebacterium, Bacillus, Pseudomonas, Cellulomonas, Streptomyces and Kloeckera.

4. The process of claim 2, wherein the pH of said medium is maintained at about 7.0 during the culturing and wherein said culturing is carried out at a temperature of from about 25° to 40° C.

References Cited

UNITED STATES PATENTS 2,979,439  4/1961  Kinoshita et al.  195—47

LIONEL M. SHAPIRO, Primary Examiner